US006785041B1

(12) United States Patent
Vodopyanov

(10) Patent No.: US 6,785,041 B1
(45) Date of Patent: Aug. 31, 2004

(54) CASCADED NONCRITICAL OPTICAL PARAMETRIC OSCILLATOR

(76) Inventor: Konstantin Vodopyanov, 1093 Lenor Way, San Jose, CA (US) 95128

( * ) Notice: Subject to any disclaimer, the term of this patent is extended or adjusted under 35 U.S.C. 154(b) by 213 days.

(21) Appl. No.: 10/001,088

(22) Filed: Oct. 31, 2001

(51) Int. Cl.$^7$ .............................. G02F 1/39; G02F 1/355
(52) U.S. Cl. ....................................... 359/330; 359/326
(58) Field of Search .................................. 359/326–332

(56) References Cited

U.S. PATENT DOCUMENTS

| 4,200,808 | A | * | 4/1980 | Herbst ......................... 359/329 |
| 4,272,694 | A | * | 6/1981 | Jacobs ......................... 359/329 |
| 4,346,314 | A | * | 8/1982 | Craxton ....................... 359/329 |
| 4,510,402 | A | * | 4/1985 | Summers et al. ............. 359/329 |
| 5,047,668 | A | * | 9/1991 | Bosenberg .................... 359/330 |
| 5,144,630 | A | * | 9/1992 | Lin .............................. 372/22 |
| 5,742,626 | A | * | 4/1998 | Mead et al. .................. 372/22 |
| 5,835,513 | A | * | 11/1998 | Pieterse et al. ............... 372/22 |
| 6,441,948 | B1 | * | 8/2002 | Wu et al. ..................... 359/326 |
| 6,532,100 | B1 | * | 3/2003 | Partanen et al. ............. 359/326 |
| 2003/0043452 | A1 | * | 3/2003 | Heist ........................... 359/326 |

\* cited by examiner

*Primary Examiner*—John D. Lee
(74) *Attorney, Agent, or Firm*—Herbert Burkard; John Schipper

(57) ABSTRACT

Method and system for providing laser light that is tunable over a relatively wide mid-infrared wavelength range, such as 2–17 $\mu$m. A first noncritically phase matched nonlinear crystal receives a laser light beam and converts the light to a first cavity beam having a first selected wavelength, using optical parametric oscillation techniques. A second noncritically phase matched nonlinear crystal receives the first cavity beam and converts the light to a second cavity beam having a second selected wavelength. Where the first wavelength is tuned (e.g., by temperature change or effective path length change) over a wavelength range of 2–5 $\mu$m, the second wavelength can vary over a higher and broader wavelength range, such as 3–17 $\mu$m.

22 Claims, 3 Drawing Sheets

CASCADED NONCRITICAL OPTICAL PARAMETRIC OSCILLATOR

FIELD OF THE INVENTION

This invention relates to a system for producing broadly tunable mid-infrared radiation.

BACKGROUND OF THE INVENTION

The mid-infrared region of the optical spectrum is often referred to as the "molecular fingerprint" region, because gases and vapors exhibit distinctive absorption features in this region. Examples of applications of mid-infrared absorption include pollution monitoring, atmospheric chemistry, and detection of presence of chemical and biological warfare substances. These applications and others can benefit from availability of compact and efficient mid-IR laser sources that allow detection and identification of trace gases and vapors.

Optical parametric oscillators (OPOs) are often the laser sources of choice where high peak power or average power, high conversion efficiency, and broad continuous tunability are required. Unfortunately, in the longwave part of the mid-IR region ($\lambda > 2$ μm), relatively few such lasers are available.

The long wavelength transmission cutoff of traditional nonlinear materials, such as lithium niobate ($LiNbO_3$), potassium titanyl phosphate (KTP), lithium borate (LiBO) and beta-barium borate (BBO), has limited the tuning range of existing, commercially available OPOs to $\lambda < 4$ μm.

On the other hand, chalcopyrites, such as ZnGeP2 (ZGP) and CdGeAs2 (CGA) exhibit very large optical nonlinearities, deep IR transparency (e.g., for $\lambda > 12$ μm) and high thermal conductivity and are the materials of choice for mid-IR OPOs for wavelengths beyond 4 μm. These materials cannot be pumped by commercially available neodymium lasers (at $\lambda \approx 1.064$ μm), because of a lack of transparency at near-infrared laser wavelengths.

What is needed is a laser system that can provide broadly tunable infrared radiation in a wavelength range between about 2 μm and about 17 μm. Preferably, this radiation should be produced reasonably efficiently and should be capable of extension to higher wavelengths as well.

SUMMARY OF THE INVENTION

These needs are met by the invention, which provides a cascaded OPO system in which, for example, a Nd laser (continuous or pulsed) pumps a first stage OPO, such as PPLN, and the output radiation from the pumped first stage pumps a second stage OPO, such as a ZGP crystal cut 90° to the optical axis of the second stage material, in a noncritical phase match configuration. The system has a relatively low pumping threshold and a relatively high efficiency

DESCRIPTION OF BEST MODES OF THE INVENTION

Figure 1:
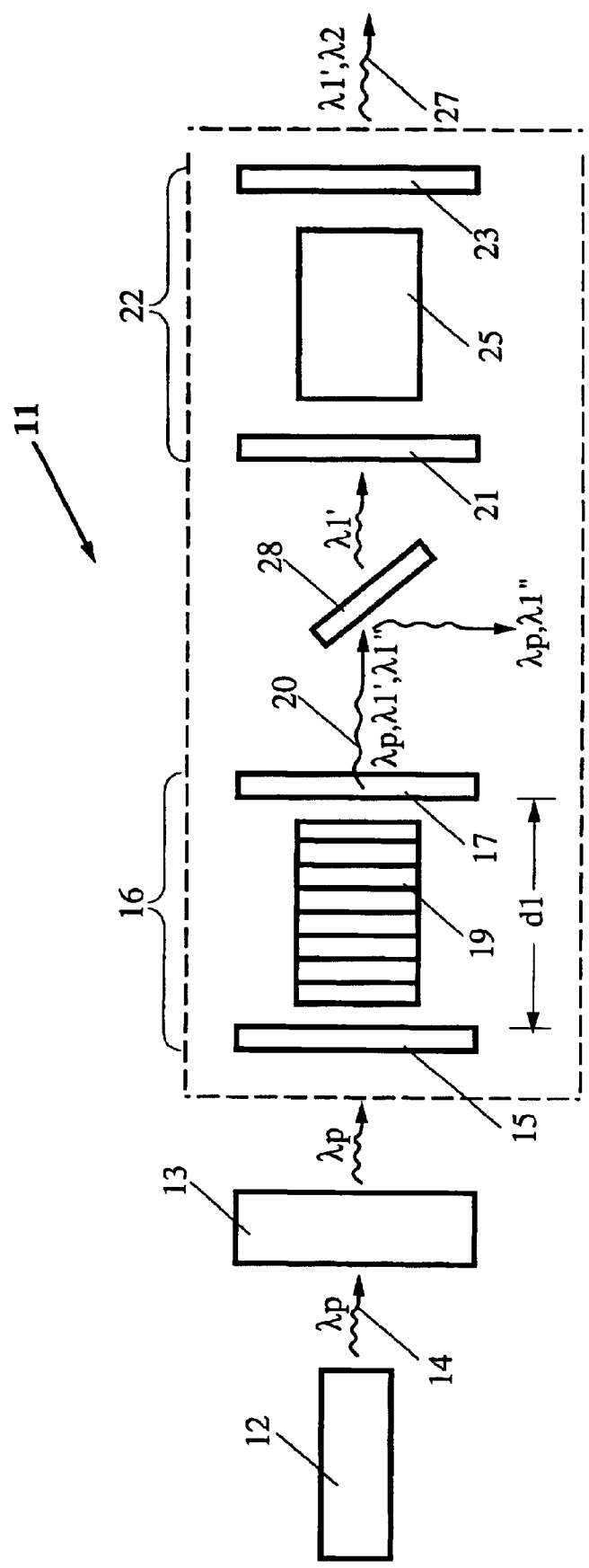
FIGS. 1 and 3 are schematic views of optical systems for practicing the invention.

FIG. 1 illustrates an embodiment 11 of the invention. A laser light source 12 provides a pump light beam 14 having a selected wavelength $\lambda p$, or narrow range of wavelengths around a central wavelength. The first light beam 14 is received by a first optical cavity 16, defined by spaced apart first and second mirrors, 15 and 17, and having a first nonlinear crystal (NLC) 19 (e.g., quasi-phase matched, periodically poled $LiNbO_3$) positioned therein. The first NLC 19 has first and second spaced apart, light transmitting surfaces to receive the pump light beam at approximately normal incidence, and one or both of the first and second light transmitting surfaces is optionally coincident with the first and second mirrors, 15 and 17, respectively, of the first cavity 16. In one approach, the laser light source 12 is an Nd:YAG laser and the pump wavelength $\lambda p$ is approximately 1.064 μm. Optionally, a Faraday rotator or other optical isolator mechanism 13 is positioned between the light source 12 and the first mirror 15 to suppress any pump wavelength radiation that might be returned toward the light source.

The system relies upon optical parametric oscillation (OPO), which is discussed in A. Yariv, *Optical Electronics in Modern Communications*, Oxford Univ. Press, New York, Fifth Ed., 1997, pp. 308–322, and in W. Koechner, *Solid State Laser Engineering*, Springer Verlag, Berlin, Second Ed. 1988, pp. 516–526.

The first NLC 19 responds as an OPO and issues a signal photon and an idler photon, for each pump photon converted. The signal photons (wavelength $\lambda'1$) or the idler photons (wavelength $\lambda''1$) can be received as a first light beam 20 by a second cavity 22. The first light beam 20, having a second wavelength $\lambda 1 = \lambda'1$ (or $=\lambda''1$), issues from the first cavity 16 and is received by the second cavity 22, which is defined by third and fourth spaced apart mirrors, 21 and 23. A second NLC 25 (e.g., non-critically phase matched $ZnGeP_2$, in bulk), positioned within the second cavity 22, has third and fourth spaced apart, light transmitting surfaces to receive the first light beam at approximately normal incidence, and one or both of the third and fourth light transmitting surfaces is optionally coincident with the third and fourth mirrors, 21 and 23, respectively, of the second cavity 22. The first wavelength $\lambda 1 = \lambda'1$ (or $=\lambda''1$) lies in a selected mid-IR range, for example, 2.4 μm $\leq \lambda 1 \leq$ 3.8 μm. This first wavelength can be varied or controlled by varying the temperature of the first NLC 19, by varying the distance d1 between the first and second mirrors, 15 and 17, or by other approaches discussed in the following.

The first and second mirrors, 15 and 17, of the first cavity 16 are spaced apart a distance d1 that satisfies $$(2/\lambda 1)\{(n1-1) \cdot d1' + d1\} = N1, \qquad (1)$$

where N1 is a selected positive integer, n1 and d1' ($\leq$d1) are the effective refractive index and the effective length of the first NLC 19, and $\lambda 1 = \lambda'1$ (or $\lambda''1$). The first cavity 16 is thus configured as a resonant optical cavity for the chosen first wavelength $\lambda 1 = \lambda'1$ (or $\lambda''1$).

Optionally, the first and second cavities, 16 and 22, are spaced apart and a selectively transmissive (ST) mirror 28 is positioned between the two cavities and oriented as shown. The ST mirror 28 is preferably coated to selectively reflect light having the pump wavelength $\lambda p$ and the unwanted wavelength $\lambda''1$ (or $\lambda'1$) so that light having these wavelengths is removed from the light beam received by the second cavity 22. The ST mirror 28 is preferably coated to selectively transmit light, having the first wavelength $\lambda 1 = \lambda'1$ (or $\lambda''1$), to the second cavity 22. The ST mirror 28 serves as a wavelength isolator for the system.

Figure 2:
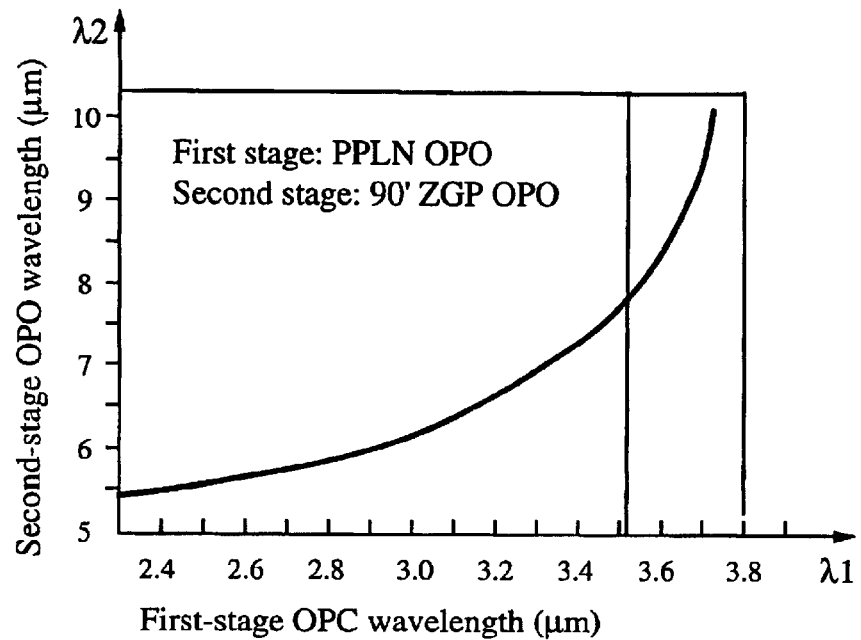
FIG. 2 is a graphical view of variation of second stage output wavelength with varying input wavelength, as provided by the invention.

The second NLC 25 responds as an OPO and issues a second signal photon (wavelength $\lambda'2$) and a second idler photon (wavelength λ"2) as part of a second light beam 27. The second light beam 27, having a second wavelength λ2=λ'2 or λ2=λ"2, issues from the second cavity 22. The second wavelength λ2 varies according to the first wavelength λ1 received from the first cavity 16, for example, over a range such as 5 μm ≦λ2≦10 μm. FIG. 2 graphically illustrates an appropriate variation of the chosen output (second) wavelength λ2 with variation of the chosen input (first) wavelength λ1 for the second stage.

The third and fourth mirrors, 21 and 23, of the second cavity 22 are spaced apart a distance d2 that satisfies $$(2/\lambda 2)\{(n2-1)\cdot d2'+d2\}=N2, \qquad (2)$$

where N2 is a selected positive integer, n2 and d2' (≦d2) are the effective refractive index and the effective length of the second NLC 25, and λ2=λ'2 (or λ"2). The second cavity 22 is thus configured as a resonant optical cavity for the chosen second wavelength λ2=λ'2 (or λ"2).

Preferably, the first and second mirrors, 15 and 17, are highly transmissive at the pump wavelength λp, and are highly reflective at the chosen first wavelength λ1=λ'1 (or=λ"1). Preferably, the third and fourth mirrors, 21 and 23, are highly transmissive at the chosen first wavelength λ1=λ'1 (or λ"1) and are highly reflective at the chosen second wavelength λ2=λ'2 (or=λ"2).

The first NLC 19 may be non-critically phase matched ("NPM") LiNbO$_3$, LiIO$_3$, KTiOPO$_4$, RbTiOAsO$_4$, CsH$_y$D$_{2-y}$AsO$_4$, β-BaB$_2$O$_4$, Ba$_2$NaNb$_{35}$O$_{15}$, Ag$_2$AsS$_3$, periodically poled LiNbO$_3$ (PPLN), periodically poled KTiOPO$_4$ (PPKTP) or any similar NLC that generates output wavelengths in a selected broad wavelength range, such as 2–5 μm. The second NLC 25 may be noncritically phase matched ZnGeP$_2$ (ZGP), CdGeAs2 (CGA), AgGaS$_2$, AgGaSe$_2$, AgGaTe$_2$, GaAs, or any similar crystal that receives and converts wavelengths in this range to a broader, higher range, such as 3–17 μm.

Figure 3:
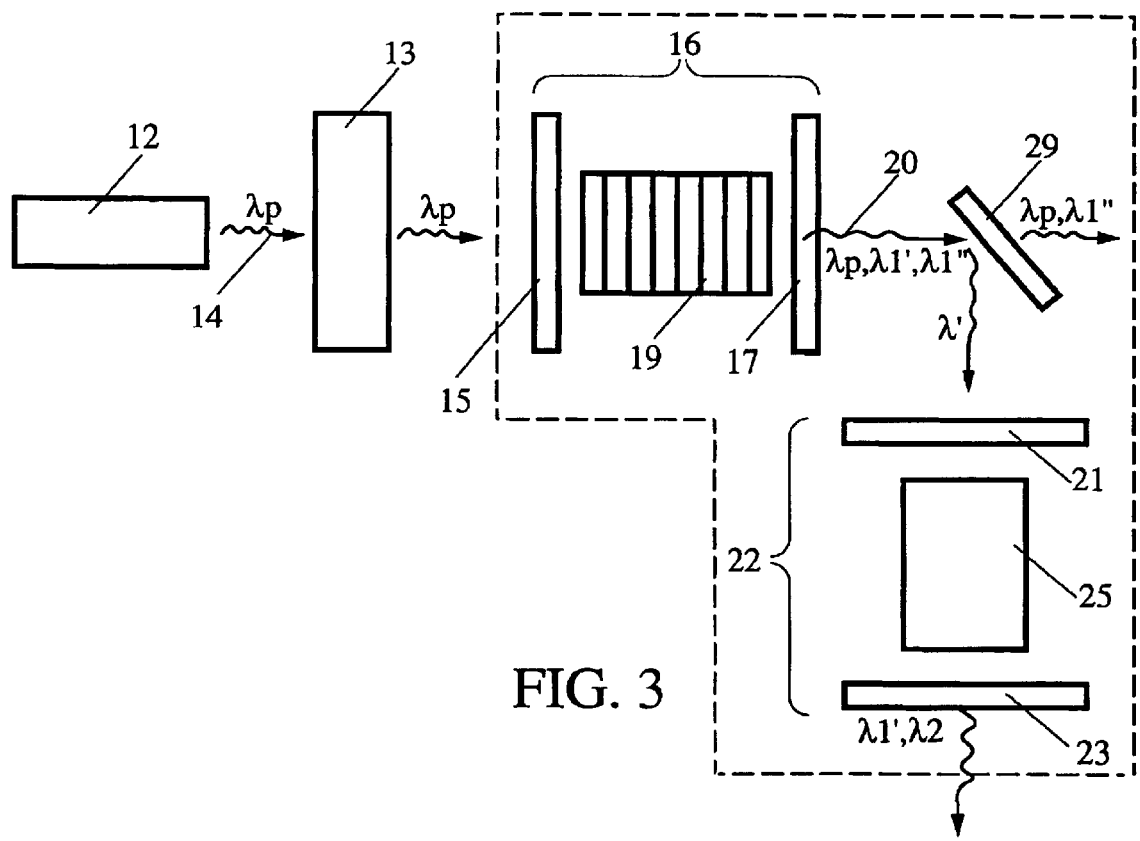

The system in FIG. 3 is substantially the same as the system in FIG. 1, but the ST mirror 28 in FIG. 1 (highly transmissive at wavelength λ1=λ'1 and highly reflective at wavelengths λp and λ"1) is replaced by another ST mirror 29 in FIG. 3 that is highly reflective at the wavelength λ1=λ'1 and highly transmissive at the wavelengths λp and λ"1.

The system shown in FIG. 1 has a relatively low pumping threshold at the light source 13 and has relatively high efficiency, because the phase matching is non-critical. Tight focusing is possible with this system so that relatively small pump thresholds are expected. Pulsed and/or CW pumping may be used here.

The first NLC 19 (and, if desired, the second NLC 25) can be tuned using any of several different approaches. In a first approach, a temperature control module is used to tune the first NLC, through varying one or more electrical or optical parameters (e.g., refractive index) of the NLC and thereby varying a (central) wavelength of a beam that issues from an NLC.

Alternatively (although not a preferred embodiment), the temperature control module can be used to tune the second NLC 25, or to tune both the first and second NLCs, 19 and 25. This alternative approach, tuning the second NLC 25 through temperature control, will often provide a smaller tunability range than will tuning of the first NLC 19 through temperature control.

Figure 4:
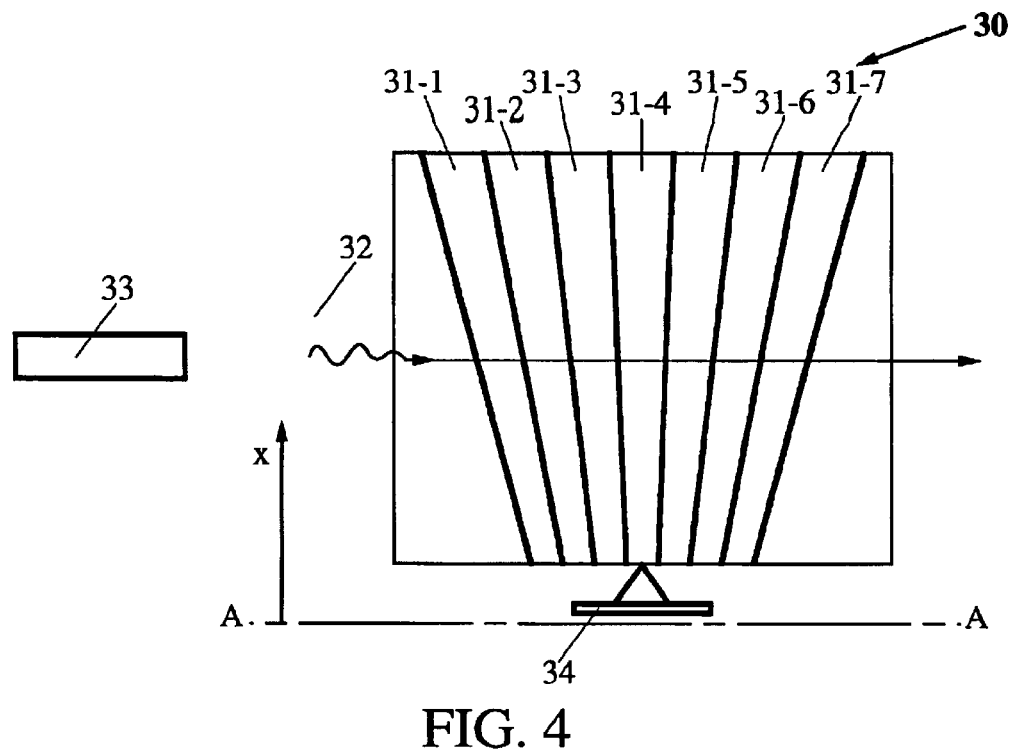
FIGS. 4 and 5 illustrate systems for varying a central wavelength of a light beam issued by a nonlinear material.

In a second approach, the standard quasi-phase matched NLC configuration with "slices" of NLC material of uniform thickness is replaced by a fanned out NLC configuration, illustrated in FIG. 4, including an assembly 30 of contiguous pie-shaped domains 31-i (i=1, ..., I; I≧1) of a suitable NLC material. A light beam 32 passes through the assembly 30 approximately parallel to a selected axis AA, and the effective thickness h(x) of each quasi-phase matched domain passed through by this beam varies with the perpendicular distance x of the beam path from the axis AA. A micro-positioning mechanism 34, such as a screw or slide, moves the assembly 30 transversely, in a direction parallel to the x-coordinate axis, and the light source 33 is preferably stationary. Control of the distance x controls the thickness h(x) and controls a (central) wavelength of a beam that issues from the NLC. In this approach, the effective thickness of a domain varies approximately continuously as the distance x varies.

Figure 5:
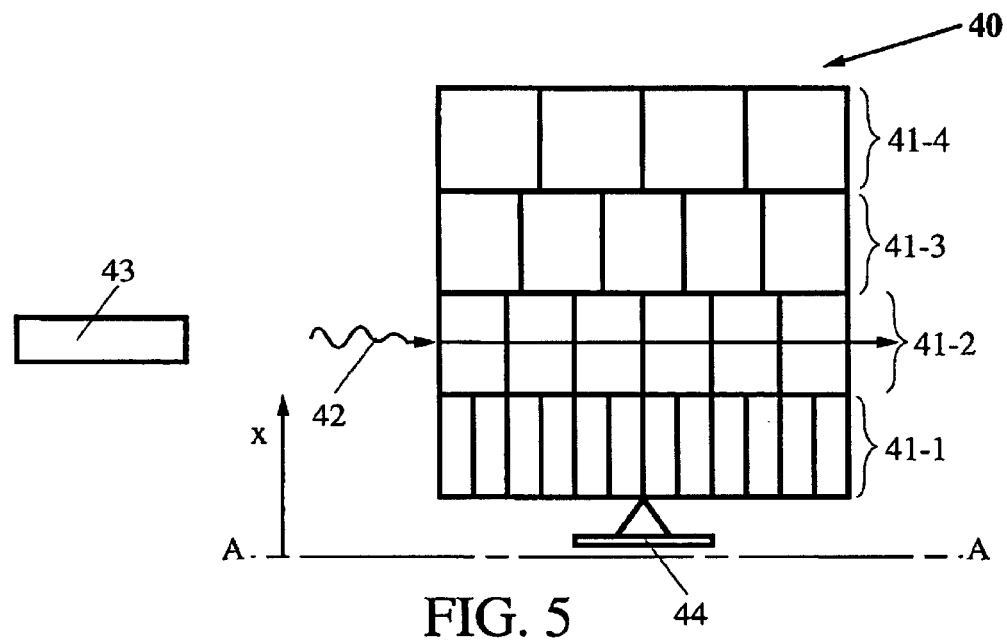

In a third approach, illustrated in FIG. 5, the NLC is an assembly 40 of rows 41-j (j=1, ..., J; J≧2), with each row (j) including a sequence of uniform length, substantially identical domains 41-(j,k) (k=1, ..., K; K≧1) of NLC material, where the length of any domain in row 41-j is $h_j$ (preferably uniform for each domain k in the row) and $h_{j1} \neq h_{j2}$ if j1≠j2. Each row 41-j has a width $w_j$ and the widths $w_j$ may be uniform or variable. Where a light beam passes through the NLC along a particular row, a light beam that issues from this row will have a (central) wavelength $\lambda_j$ (j=1, ..., J), where $\lambda_{j1} \neq \lambda_{j2}$ if j1≠j2. For convenience, one may arrange that $\lambda_{j1} < \lambda_{j2} < ... < \lambda j$. A light beam (central) wavelength will thus have one of the J wavelength values within each row 41-j. A micro-positioning mechanism 44, such as a screw or slide, moves the assembly 40 transversely, in a direction parallel to the x-coordinate axis, and the light source 43 is preferably stationary.

For a particular row 41-j' in FIG. 5, the (central) wavelength $\lambda_j$ can be varied between $\lambda_{j-1}$ and $\lambda_{j+1}$ by varying the temperature of the NLC material. Proceeding in this manner, the (central) wavelength of the light beam issued by the NLC assembly 40 can be varied from $\lambda_1$ to $\lambda_j$, or over a greater range if desired. In the absence of variation of temperature, the effective length of each row 41-j of NLC material varies over a discrete set of values.

What is claimed is:

1. A method for providing laser light that is tunable over a relatively wide wavelength range, the method comprising:

providing a laser pump beam having a selected pump wavelength;

receiving the pump beam at a first selected noncritically phase matched nonlinear crystal positioned within a first optical cavity, and providing a first cavity output laser beam having at least a first selected wavelength in a first wavelength range;

receiving the first cavity beam at a second selected noncritically phase matched nonlinear crystal positioned within a second optical cavity, converting the first cavity beam and issuing a second cavity laser output beam having a second selected wavelength in a second wavelength range whose lower limit and upper limit are above a lower limit and above an upper limit, respectively, for the first range, providing the first nonlinear crystal with an effective length of propagation L1(x) of the pump beam through the first crystal that varies continuously with a distance x, measured from a selected axis having a first direction that is substantially parallel to the path of propagation, in a second direction substantially perpendicular to the first direction, where the distance x is varied by translating the first crystal in the second direction; and providing at least first and second paths of pump beam propagation, corresponding to respective first and second distinct values of the effective length of propagation L1(x) of the pump beam through the first crystal, whereby a shift in the selected wavelength in the first range is accompanied by a shift to a larger wavelength in the second wavelength in the second range and the selected wavelength in the first range is continuously tunable.

2. The method of claim 1, further comprising providing as said first nonlinear crystal a crystal drawn from the group consisting of $LiNbO_3$, $LiIO_3$, $KTiOPO_4$, $RbTiOAsO_4$, $CsH_yD_{2-y}AsO_4$, $\beta$-$BaB_2O_4$, $Ba_2NaNb_{35}O_{15}$, $Ag_2AsS_3$, periodically poled $LiNbO_3$ (PPLN) and periodically poled $KTiOPO_4$ (PPKTP).

3. The method of claim 1, further comprising providing as said second nonlinear crystal a crystal drawn from the group consisting of $ZnGeP_2$ (ZGP), CdGeAs2 (CGA), $AgGaS_2$, $AgGaSe_2$, $AgGaTe_2$ and GaAs.

4. The method of claim 1, further comprising providing as said first cavity beam a beam having said selected first wavelength in a range $2 \mu m \leq \lambda \leq 5 \mu m$.

5. The method of claim 1, further comprising providing as said second cavity beam a beam having said selected second wavelength in a range $3 \mu m \leq \lambda < 17 \mu m$.

6. The method of claim 1, further comprising providing said first cavity with at least one mirror that is highly transmissive at said pump wavelength and highly reflective at said first wavelength.

7. The method of claim 1, further comprising providing said second cavity with at least one mirror that is highly transmissive at said first wavelength and highly reflective at said second wavelength.

8. The method of claim 1, further comprising removing substantially all light having said pump wavelength after said first cavity beam is provided by said first nonlinear crystal.

9. The method of claim 8, further comprising providing, in an optical path between said first and second cavities, a selectively transmitting mirror that is highly transmissive at said pump wavelength and is highly reflective at said first wavelength.

10. The method of claim 8, further comprising providing, in an optical path between said first and second cavities, a selectively transmitting mirror that is highly reflective at said pump wavelength and is highly transmissive at said first wavelength.

11. A method for providing laser light that is tunable over a relatively wide wavelength range, the method comprising:

providing a laser pump beam having a selected pump wavelength;

receiving the pump beam at a first selected noncritically phase matched nonlinear crystal positioned within a first optical cavity, and providing a first cavity output laser beam having at least a first selected wavelength in a first wavelength range;

receiving the first cavity beam at a second selected noncritically phase matched nonlinear crystal positioned within a second optical cavity, converting the first cavity beam and issuing a second cavity laser output beam having a second selected wavelength in a second wavelength range whose lower limit and upper limit are above a lower limit and above an upper limit, respectively, for the first range, providing the first nonlinear crystal with an effective length of propagation L1(x) of the pump beam through the first crystal that varies discretely, among at least first, second and third distinct values, with a distance x, measured from a selected axis having a first direction that is substantially parallel to the path of propagation, in a second direction substantially perpendicular to the first direction, where the distance x is varied by translating the first crystal in the second direction; and providing at least first, second and third paths of pump beam propagation, corresponding to the respective first, second and third distinct values of the effective length of propagation L1(x) of the pump beam through the first crystal, whereby a shift in the selected wavelength in the first range is accompanied by a shift to a larger wavelength in the second wavelength in the second range and the selected wavelength in the first range is discretely tunable.

12. The system of claim 11, wherein said first nonlinear crystal is drawn from the group consisting of $LiNbO_3$, $LiIO_3$, $KTiOPO_4$, $RbTiOAsO_4$, $CsH_yD_{2-y}AsO_4$, $\beta$-$BaB_2O_4$, $Ba_2NaNb_{35}O_{15}$, $Ag_2AsS_3$, periodically poled $LiNbO_3$ (PPLN) and periodically poled $KTiOPO_4$ (PPKTP).

13. The system of claim 11, wherein said second nonlinear crystal is drawn from the group consisting of $ZnGeP_2$ (ZGP), CdGeAs2 (CGA), $AgGaS_2$, $AgGaSe_2$, $AgGaTe_2$ and GaAs.

14. The system of claim 11, wherein said first cavity beam has as said selected first wavelength a range $2 \leq \lambda \leq 5 \mu m$.

15. The system of claim 11, wherein said second cavity beam has as said selected second wavelength a range $3 \leq \lambda \leq 17 \mu m$.

16. The system of claim 11, wherein said first cavity has at least one mirror that is highly transmissive at said pump wavelength and highly reflective at said first wavelength.

17. The system of claim 11, wherein said second cavity has at least one mirror that is highly transmissive at said first wavelength and highly reflective at said second wavelength.

18. The system of claim 11, further comprising a wavelength isolator mechanism, positioned to receive said first cavity beam and to remove substantially all of said pump wavelength from said first cavity beam.

19. The system of claim 18, further comprising a selectively transmitting mirror that is highly transmissive at said pump wavelength and is highly reflective at said first wavelength, positioned in an optical path between said first and second cavities.

20. The system of claim 18, further comprising a selectively transmitting mirror that is highly reflective at said pump wavelength and is highly transmissive at said first wavelength, positioned in an optical path between said first and second cavities.

21. A method for providing laser light that is tunable over a relatively wide wavelength range, the method comprising:

providing a laser pump beam having a selected pump wavelength;

receiving the pump beam at a first selected noncritically phase matched nonlinear crystal positioned within a first optical cavity, and providing a first cavity output laser beam having at least a first selected wavelength in a first wavelength range;

receiving the first cavity beam at a second selected noncritically phase matched nonlinear crystal positioned within a second optical cavity, converting the first cavity beam and issuing a second cavity laser output beam having a second selected wavelength in a second wavelength range whose lower limit and upper limit are above a lower limit and an upper limit, respectively, for the first range, providing the second nonlinear crystal with an effective length of propagation L2(x) of the first cavity beam through the second crystal that varies continuously with a distance x, measured from a selected axis having a first direction that is substantially parallel to the path of propagation, in a second direction substantially perpendicular to the first direction, where the distance x is varied by translating the second crystal in the second direction; and providing at least first and second paths of pump beam propagation, corresponding to respective first and second distinct values of the effective length of propagation L2(x) of the first cavity beam through the second crystal, whereby a shift in the selected wavelength in the first range is accompanied by a shift to a larger wavelength in the second wavelength in the second range and the selected wavelength in the second range is continuously tunable.

22. A method for providing laser light that is tunable over a relatively wide wavelength range, the method comprising:

providing a laser pump beam having a selected pump wavelength;

receiving the pump beam at a first selected noncritically phase matched nonlinear crystal positioned within a first optical cavity, and providing a first cavity output laser beam having at least a first selected wavelength in a first wavelength range;

receiving the first cavity beam at a second selected noncritically phase matched nonlinear crystal positioned within a second optical cavity, converting the first cavity beam and issuing a second cavity laser output beam having a second selected wavelength in a second wavelength range whose lower limit and upper limit are above a lower limit and an upper limit, respectively, for the first range, providing the second nonlinear crystal with an effective length of propagation L2(x) of the first cavity beam through the second crystal that varies discretely among at least first, second and third distinct values with a distance x, measured from a selected axis having a first direction that is substantially parallel to the path of propagation, in a second direction substantially perpendicular to the first direction, where the distance x is varied by translating the second crystal in the second direction; and providing at least first, second and third paths of pump beam propagation, corresponding to the respective first, second and third distinct values of the effective length of propagation L2(x) of the first cavity beam through the second crystal, whereby a shift in the selected wavelength in the first range is accompanied by a shift to a larger length in the second wavelength in the second range and the selected wavelength in the second range is discretely tunable.

* * * * *